US011425268B2

(12) United States Patent
Shinohara

(10) Patent No.: US 11,425,268 B2
(45) Date of Patent: Aug. 23, 2022

(54) IMAGE PROCESSING APPARATUS, METHOD OF CONTROLLING IMAGE PROCESSING APPARATUS, AND STORAGE MEDIUM

(71) Applicant: CANON KABUSHIKI KAISHA, Tokyo (JP)

(72) Inventor: Taku Shinohara, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/065,377

(22) Filed: Oct. 7, 2020

(65) Prior Publication Data

US 2021/0120133 A1  Apr. 22, 2021

(30) Foreign Application Priority Data

Oct. 18, 2019  (JP) .............................. JP2019-191579

(51) Int. Cl.
*G06F 3/12* (2006.01)
*H04N 1/00* (2006.01)

(52) U.S. Cl.
CPC ..... *H04N 1/00214* (2013.01); *H04N 1/00236* (2013.01); *H04N 1/00323* (2013.01)

(58) Field of Classification Search
CPC ........... H04N 1/00214; H04N 1/00236; H04N 1/00323
See application file for complete search history.

(56) References Cited

U.S. PATENT DOCUMENTS

| 2008/0094665 | A1* | 4/2008 | Nakai | H04N 1/00843 |
| | | | | 358/401 |
| 2010/0128331 | A1* | 5/2010 | Hamano | H04N 1/00801 |
| | | | | 358/505 |
| 2013/0155437 | A1* | 6/2013 | Muramoto | H04N 1/00933 |
| | | | | 358/1.13 |

FOREIGN PATENT DOCUMENTS

JP  2013-153521 A  8/2013

* cited by examiner

*Primary Examiner* — Moustapha Diaby
(74) *Attorney, Agent, or Firm* — Canon U.S.A., Inc., IP Division

(57) ABSTRACT

Exceeding a data bus limit is prevented by selecting a data transfer rate based on a color reading setting and other reading settings. An image processing apparatus including a reading unit configured to read a document, an image processing unit configured to process image data generated by reading the document with the reading unit, and a transfer unit configured to transfer the image data from the reading unit to the image processing unit further includes a reception unit configured to receive a color reading setting indicating whether the reading unit reads the document in color or monochrome and other reading settings and a selection unit configured to select an image data transfer rate of the transfer unit based on the color reading setting and the other reading setting received by the reception unit.

26 Claims, 16 Drawing Sheets

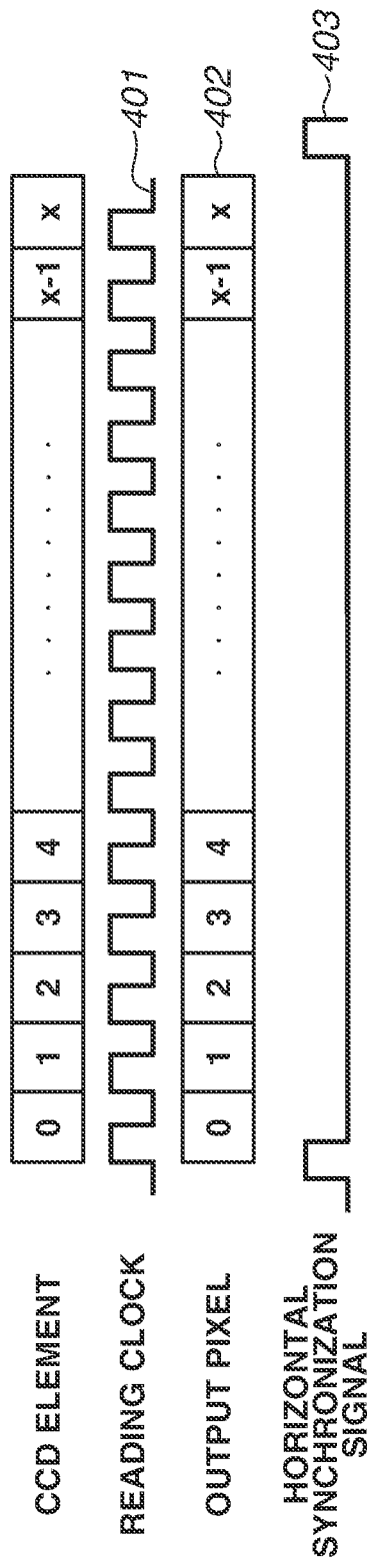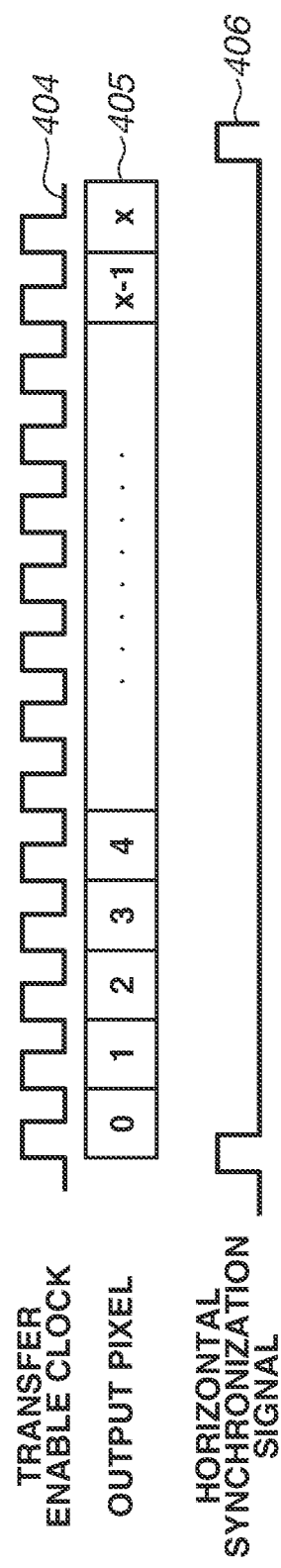

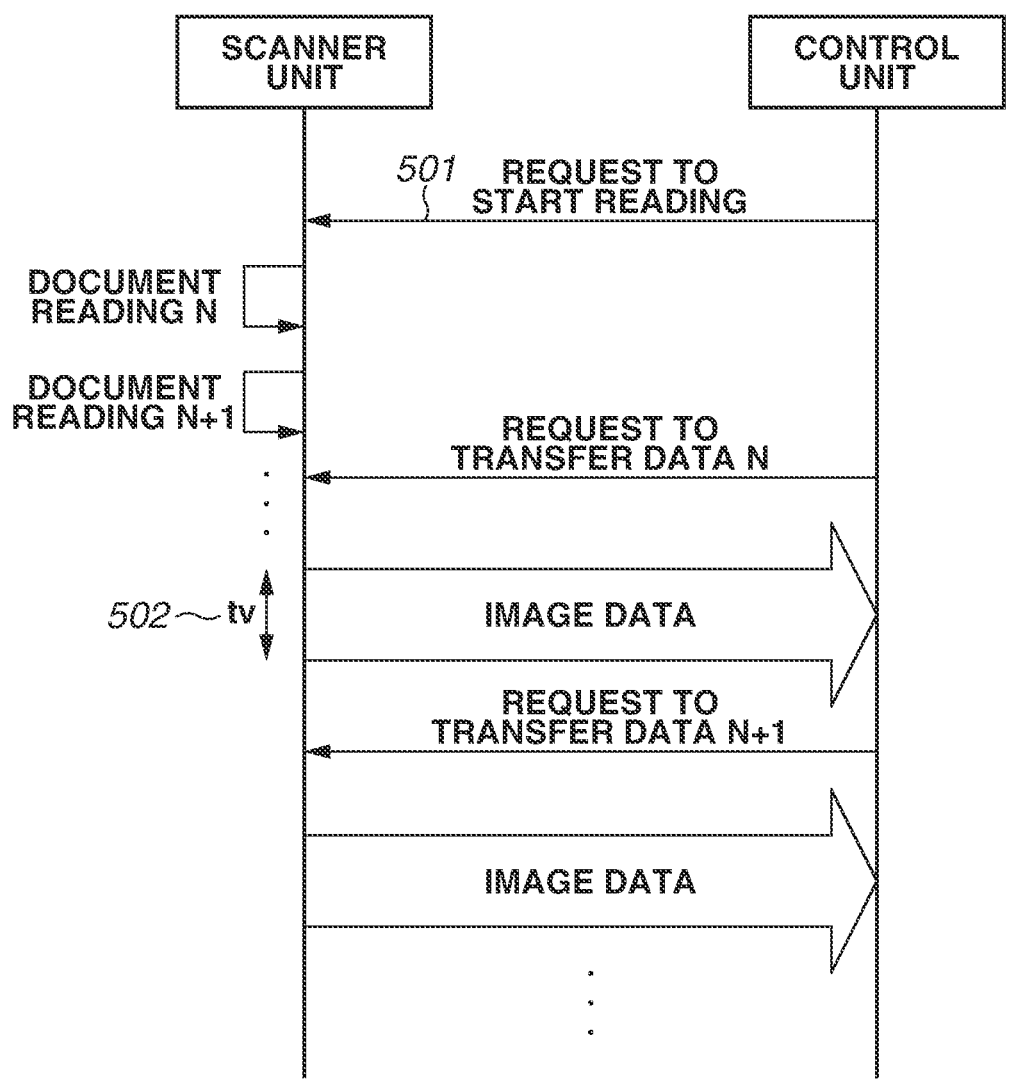

FIG.9

| COLOR SCAN/ MONOCHROME SCAN (901) | ONE-SIDED/ TWO-SIDED (902) | RESOLUTION (903) | IMAGE SIZE (904) | TRANSFER CLOCK (905) |
|---|---|---|---|---|
| COLOR SCAN | ONE-SIDED | 600 × 600 dpi | SMALLER THAN A4 | MEDIUM SPEED |
| | | | A4 OR LARGER | LOW SPEED |
| | | 300 × 300 dpi | SMALLER THAN A4 | HIGH SPEED |
| | | | A4 OR LARGER | HIGH SPEED |
| | TWO-SIDED | 600 × 600 dpi | SMALLER THAN A4 | MEDIUM SPEED |
| | | | A4 OR LARGER | MEDIUM SPEED |
| | | 300 × 300 dpi | SMALLER THAN A4 | HIGH SPEED |
| | | | A4 OR LARGER | HIGH SPEED |
| MONOCHROME SCAN | ONE-SIDED | 600 × 600 dpi | SMALLER THAN A4 | HIGH SPEED |
| | | | A4 OR LARGER | HIGH SPEED |
| | | 300 × 300 dpi | SMALLER THAN A4 | HIGH SPEED |
| | | | A4 OR LARGER | HIGH SPEED |
| | TWO-SIDED | 600 × 600 dpi | SMALLER THAN A4 | HIGH SPEED |
| | | | A4 OR LARGER | MEDIUM SPEED |
| | | 300 × 300 dpi | SMALLER THAN A4 | HIGH SPEED |
| | | | A4 OR LARGER | HIGH SPEED |

FIG.11

| JOB TYPE | TRANSFER CLOCK |
|----------|----------------|
| COPY | LOW SPEED |
| BOX | LOW SPEED |
| SEND | HIGH SPEED |
| FAX | HIGH SPEED |
| OTHER | MEDIUM SPEED |

| COLOR SCAN/ MONOCHROME SCAN | ONE-SIDED/ TWO-SIDED | RESOLUTION | IMAGE SIZE | IMAGE PROCESSING OTHER THAN SCANNING | TRANSFER CLOCK |
|---|---|---|---|---|---|
| COLOR SCAN | ONE-SIDED | 600 x 600 dpi | SMALLER THAN A4 | YES | MEDIUM SPEED |
| | | | | NO | MEDIUM SPEED |
| | | | A4 OR LARGER | YES | LOW SPEED |
| | | | | NO | LOW SPEED |
| | | 300 x 300 dpi | SMALLER THAN A4 | YES | HIGH SPEED |
| | | | | NO | HIGH SPEED |
| | | | A4 OR LARGER | YES | MEDIUM SPEED |
| | | | | NO | HIGH SPEED |
| | TWO-SIDED | 600 x 600 dpi | SMALLER THAN A4 | YES | LOW SPEED |
| | | | | NO | MEDIUM SPEED |
| | | | A4 OR LARGER | YES | LOW SPEED |
| | | | | NO | MEDIUM SPEED |
| | | 300 x 300 dpi | SMALLER THAN A4 | YES | MEDIUM SPEED |
| | | | | NO | HIGH SPEED |
| | | | A4 OR LARGER | YES | LOW SPEED |
| | | | | NO | HIGH SPEED |
| MONOCHROME SCAN | ONE-SIDED | 600 x 600 dpi | SMALLER THAN A4 | YES | HIGH SPEED |
| | | | | NO | HIGH SPEED |
| | | | A4 OR LARGER | YES | HIGH SPEED |
| | | | | NO | HIGH SPEED |
| | | 300 x 300 dpi | SMALLER THAN A4 | YES | HIGH SPEED |
| | | | | NO | HIGH SPEED |
| | | | A4 OR LARGER | YES | HIGH SPEED |
| | | | | NO | HIGH SPEED |
| | TWO-SIDED | 600 x 600 dpi | SMALLER THAN A4 | YES | HIGH SPEED |
| | | | | NO | HIGH SPEED |
| | | | A4 OR LARGER | YES | MEDIUM SPEED |
| | | | | NO | MEDIUM SPEED |
| | | 300 x 300 dpi | SMALLER THAN A4 | YES | HIGH SPEED |
| | | | | NO | HIGH SPEED |
| | | | A4 OR LARGER | YES | HIGH SPEED |
| | | | | NO | HIGH SPEED |

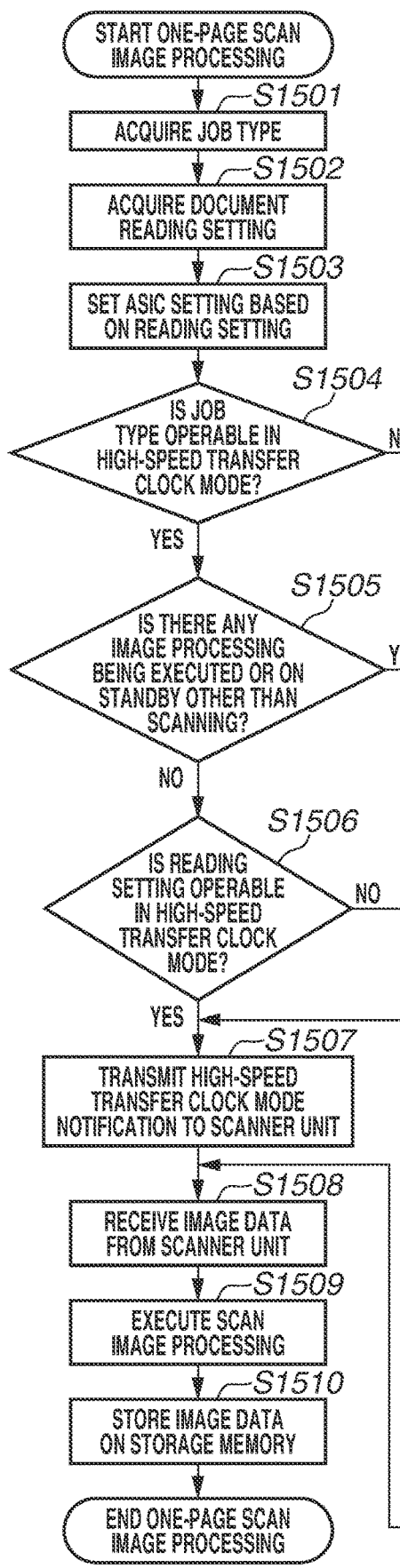
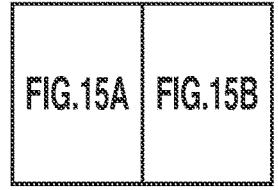
FIG.15A
FIG.15

IMAGE PROCESSING APPARATUS, METHOD OF CONTROLLING IMAGE PROCESSING APPARATUS, AND STORAGE MEDIUM

BACKGROUND OF THE INVENTION

Field of the Invention

The present disclosure relates to image processing apparatuses, methods of controlling an image processing apparatus, and storage mediums.

Description of the Related Art

In a conventionally known technique, a plurality of reading rates is set to an image reading unit configured to read a document image and generate image data, and different reading rates are used for different purposes of use (refer to Japanese Patent Application Laid-Open No. 2013-153521).

A control unit configured to receive image data generated by the image reading unit and process the received image data includes various image processing units. The respective image processing units execute image processing by exchanging image data using a shared memory. In this case, image data is transmitted and received via the same data bus.

Meanwhile, an amount of data that can be processed by the data bus of the image processing units during a predetermined time period is limited. When various image processings are simultaneously executed, the limit of the data bus may be exceeded, which causes the data transfer processing to delay or stop. In this case, subsequent image data cannot be acquired from the image reading unit, so that the image reading operation may not be normally continued.

The amount of image data transfer from the image reading unit differs depending on an image reading operation setting. For example, the amount of data transfer is greater at 600×600 dpi than at 300×300 dpi. If data is transferred at the same transfer rate at 300×300 dpi and at 600×600 dpi, the image reading operation may not be normally continued.

SUMMARY OF THE INVENTION

According to an aspect of the present disclosure, an image processing apparatus includes a reading unit configured to read a document, an image processing unit configured to process image data generated with the document read by the reading unit, a transfer unit configured to transfer the image data from the reading unit to the image processing unit, a reception unit configured to receive a color reading setting indicating whether the reading unit reads the document in color or monochrome and other reading settings, and a selection unit configured to select an image data transfer rate of the transfer unit based on the color reading setting and the other reading settings received by the reception unit.

Further features of the present disclosure will become apparent from the following description of exemplary embodiments with reference to the attached drawings.

BRIEF DESCRIPTION OF THE DRAWINGS

FIGS. 4A and 4B are clock timing charts of the scanner unit according to an exemplary embodiment of the present disclosure.

FIG. 5 is a sequence diagram of reading control according to an exemplary embodiment of the present disclosure.

FIG. 9 illustrates transfer clock selection conditions according to the first exemplary embodiment.

FIG. 11 illustrates transfer clock selection conditions according to the second exemplary embodiment.

FIG. 14 illustrates transfer clock selection conditions according to the third exemplary embodiment.

FIG. 15, FIG. 15A, and FIG. 15B is a flowchart illustrating an operation of an image processing apparatus according to a fourth exemplary embodiment.

DESCRIPTION OF THE EMBODIMENTS

Various exemplary embodiments of the present disclosure will be described in detail below with reference to the attached drawings. It should be noted that the exemplary embodiments disclosed herein are not intended to limit the scope of the claims and that every combination of features described in the exemplary embodiments is not always essential to a technical solution of the disclosure.

Figure 1:
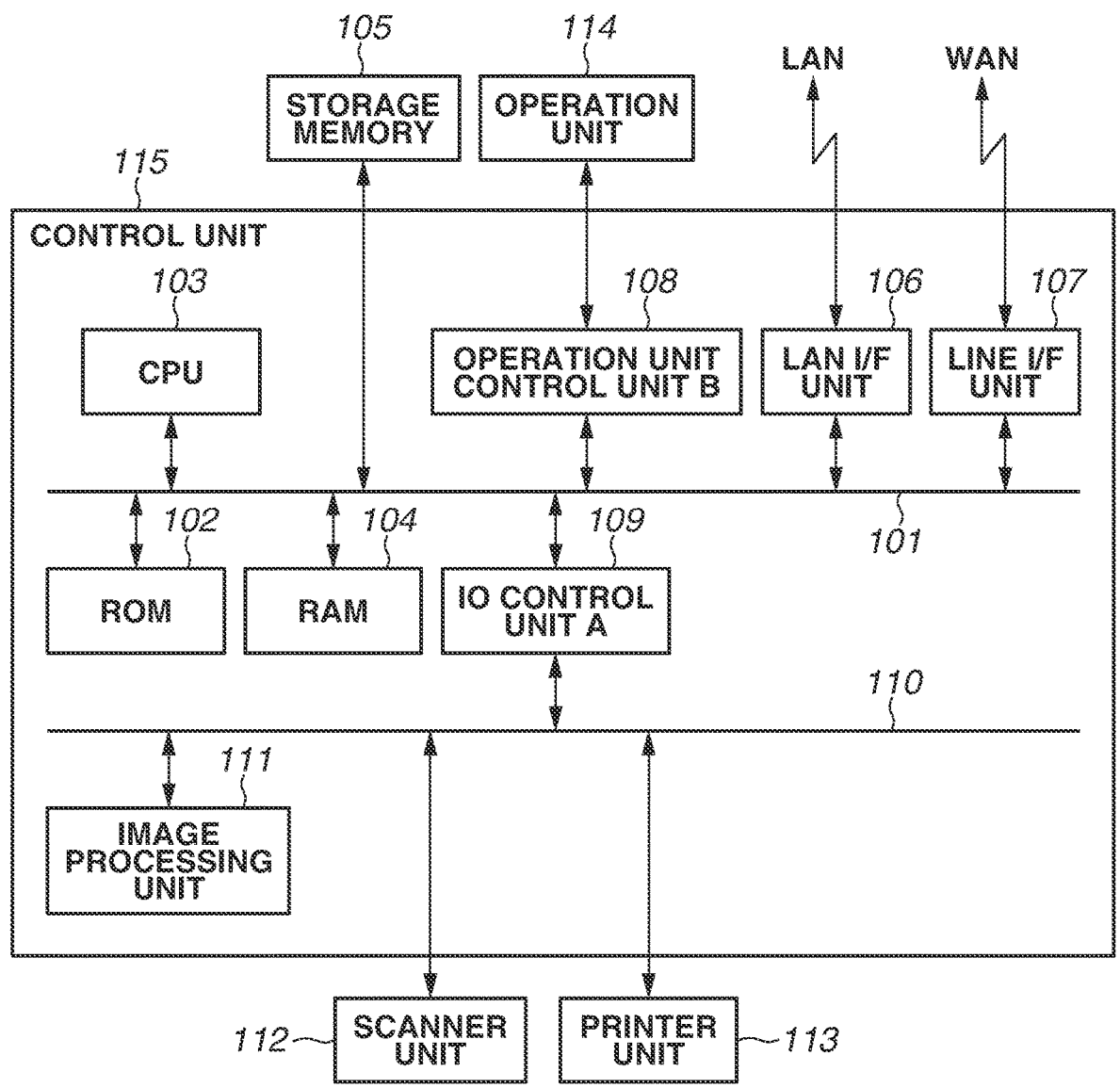
FIG. 1 is a system block diagram illustrating an image processing apparatus according to an exemplary embodiment of the present disclosure.

A first exemplary embodiment will be described below. FIG. 1 is a block diagram illustrating a control unit 115. FIG. 1 illustrates a configuration of an image processing apparatus according to the present exemplary embodiment.

The components of the control unit 115 are connected to a system bus 101 and an image bus 110.

A central processing unit (CPU) 103 comprehensively controls the image processing apparatus. A read-only memory (ROM) 102 stores various programs (system boot program, system software, etc.) read by the CPU 103.

A random access memory (RAM) 104 is a system work memory area for software execution by the CPU 103. The RAM 104 is also an image memory for temporarily storing image data during processing of the image data.

A storage memory 105 is used as an internal storage. The storage memory 105 stores data read from a scanner unit 112, image data, and system software. The storage memory 105 includes a hard disk drive (HDD) and a solid state drive (SSD).

A local area network (LAN) interface (I/F) unit 106 is an I/F unit for connecting to a LAN, and information is input to and output from a device connected to the LAN via the LAN I/F unit 106.

A line I/F unit 107 is an I/F unit for connecting to a wide area network (WAN), and information is input to and output from a device connected to the WAN via the line I/F unit 107.

The CPU 103, the ROM 102, the RAM 104, the storage memory 105, the LAN I/F unit 106, and the line I/F unit 107 are provided on the system bus 101.

An input/output (IO) control unit A 109 is a bus bridge that connects the system bus 101 to the image bus 110 and converts a configuration of data from the system bus 101. The image bus 110 transfers image data at high speed.

The image bus 110 includes a general-purpose bus, such as a Peripheral Component Interconnect (PCI) bus, Institute of Electrical and Electronics Engineers (IEEE) 1394 bus, or PCI Express bus. The scanner unit 112, a printer unit 113, and an image processing unit 111 are provided on the image bus 110 and connected together, and synchronous/non-synchronous conversion is executed on image data. The scanner unit 112 and the printer unit 113 are image input/output devices.

The image processing unit 111 includes a plurality of application-specific integrated circuits (ASICs) configured to execute image processing, such as resolution conversion, compression and decompression, and binary/multi-value conversion, on input/output image data.

An operation unit control unit B 108 is an interface unit between the control unit 115 and an operation unit 114 (user interface) and outputs image data for display on the operation unit 114, to the operation unit 114. Further, the operation unit control unit B 108 transmits information input by a system user via the operation unit 114 to the CPU 103. The operation unit control unit B 108 is an I/F unit via which software controls the operation unit 114 including a display apparatus and a keypad apparatus. The operation unit 114 includes a liquid crystal display (LCD) touch panel and hardware keys. The operation unit 114 interprets a video graphics array (VGA) signal output from the operation unit control unit B 108 and displays the interpreted signal.

Figure 2:
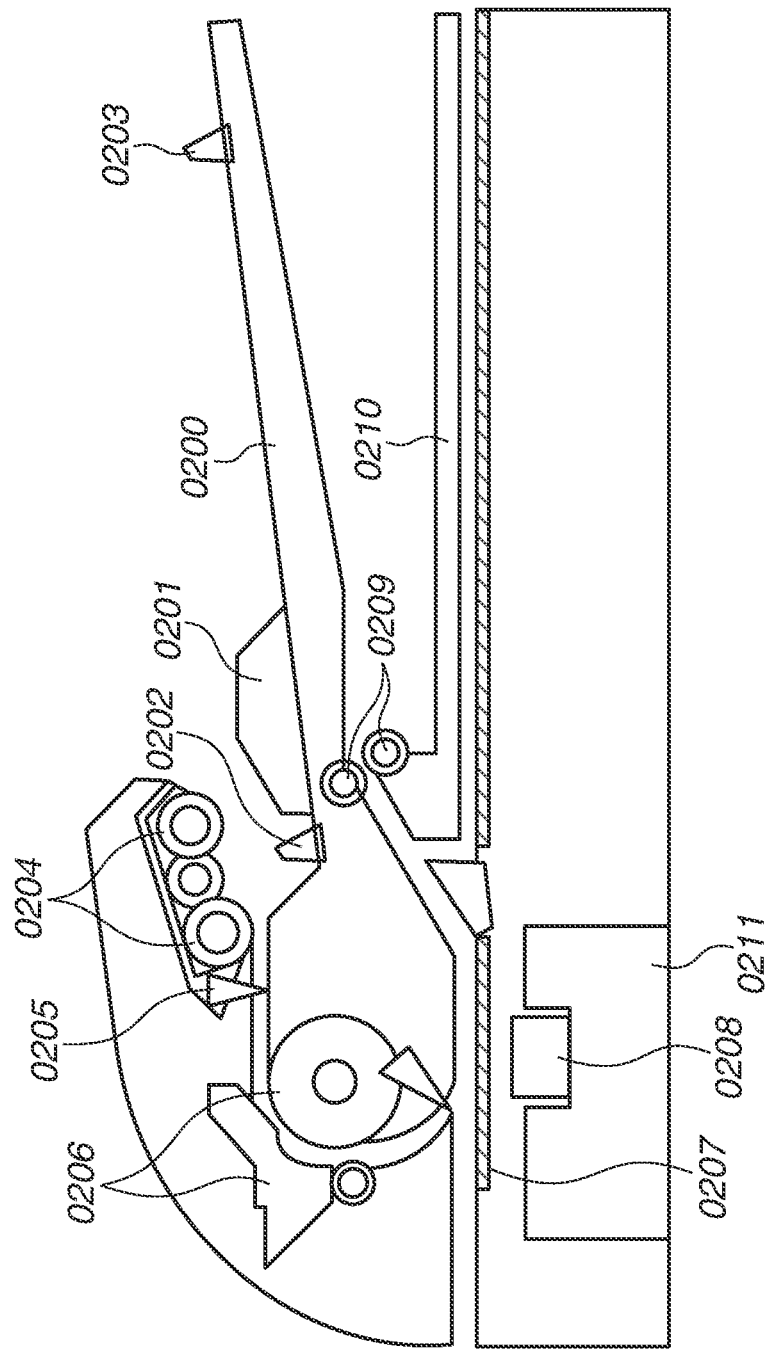
FIG. 2 illustrates an automatic document feeding apparatus (ADF) according to an exemplary embodiment of the present disclosure.

FIG. 2 is a side sectional view illustrating an internal configuration of a document feeder (DF) unit of the scanner unit 112. The DF unit includes a document tray 0200, and a document to be read is placed on the document tray 0200. A document sensor 0202, two document guides 0201, and a document size detection sensor 0203 are provided on the document tray 0200 to detect whether there is a document. The two document guides 0201 are arranged next to each other in a longitudinal direction of document (perpendicular to a document sheet conveyance direction), and a document placed on the document tray 0200 is conveyed by a pickup roller 0204, a sheet conveyance roller 0206, and a sheet discharge roller 0209. The pickup roller 0204 conveys a document on the document tray 0200 into a document sheet conveyance path in the DF unit. The sheet conveyance roller 0206 conveys a document conveyed into the document sheet conveyance path by the pickup roller 0204, and the sheet discharge roller 0209 discharges a document conveyed by the sheet conveyance roller 0206 onto a sheet discharge tray 0210.

Further, a document conveyed by the pickup roller 0204 is detected by a document passage detection sensor 0205, and whether a first document has passed is determined based on the detection time. Further, while not illustrated, the sheet conveyance roller 0206, the pickup roller 0204, and the sheet discharge roller 0209 are all driven by a stepping motor. The DF unit realizes sub-scan decimation processing by setting a driving pulse of the sheet conveyance roller 0206, the pickup roller 0204, and the sheet discharge roller 0209 to a double frequency. A document conveyed by the DF unit is read through a DF reading window 0207 by a contact image sensor (CIS) 0208 of a sensor unit 0211 under the DF reading window 0207. The sensor unit 0211 is freely movable in a sub-scan direction and is also movable in the same direction as a sheet conveyance direction of a document conveyed from the sheet conveyance roller 0206 toward the sheet discharge roller 0209. The DF reading window 0207 has some degree of length in the sub-scan direction, and the CIS 0208 can be moved to any position within the length range and can read a document at the position. The CIS 0208 includes a photoelectric conversion element, such as a charge-coupled device (CCD) element, and executes FIFO image storage on each element while generating a control signal for controlling the FIFO image storage and the CCD element. The CIS 0208 is generally realized by a plurality of aligned photoelectric conversion elements.

Figure 3:
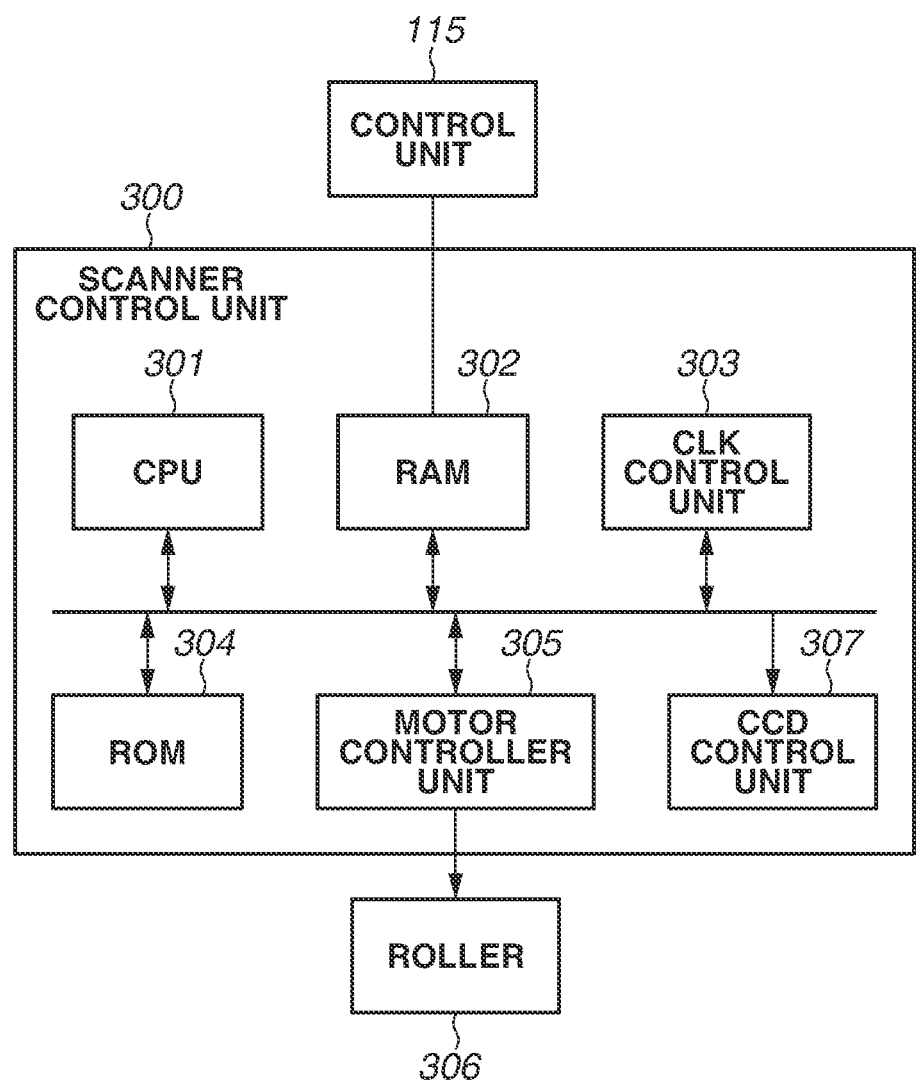
FIG. 3 is a block diagram illustrating a control unit configured to control a scanner unit according to an exemplary embodiment of the present disclosure.

FIG. 3 illustrates a block of hardware for controlling the scanner unit 112. The block is included in the scanner unit 112.

A scanner control unit 300 includes a CPU 301, a RAM 302, a CLK control unit 303, a ROM 304, a motor controller unit 305, and a CCD control unit 307. An application program configured to control the scanner unit 112 is stored on the ROM 304 and executed by the CPU 301.

The CLK control unit 303 distributes clocks to the blocks. The CLK control unit 303 includes a crystal oscillator and a phase-locked loop (PLL) element. The crystal oscillator generates clocks, and the PLL element multiplies/divides the clocks generated by the crystal oscillator.

The scanner unit control application configured to control the scanner control unit 300 outputs a control clock from the CLK control unit 303 to the motor controller unit 305, the CCD control unit 307, and the RAM 302 based on an instruction in scanning. The blocks execute further multiplication/division based on the clocks input from the CLK control unit 303 and generate a control clock for the CCD element and the motor that rotates the various rollers.

The instruction given in scanning contains information indicating color or monochrome and resolution information, and the scanner unit control application changes a PLL setting of the CLK control unit 303 based on the content of the instruction.

Various clock frequencies are set by changing the PLL setting to thereby change a reading rate. The RAM 302 stores image data read by the CIS 0208. In the present exemplary embodiment, the RAM 302 has an enough capacity to store up to four A4-size images.

In signal reading from the CIS 0208, an amount of data to be read is controlled using a reading clock to read an image from each pixel and a transfer enable clock as to whether to transfer a read pixel to the control unit 115. FIGS. 4A and 4B briefly illustrate the concept. For simplification, only an operation of inputting all data without reducing the number of pixels and an operation of inputting the data by reducing the number of pixels to ½ will be described below, but the present exemplary embodiment is not limited to the operation with the number of pixels reduced to ½. Data reading from each photoelectric conversion element is controlled by a reading clock 401. The data is read from each element from the CIS 0208 at a rising edge of the reading clock 401.

Read pixel data 402 is acquired by a buffer according to the FIFO rule. The data acquired by the buffer according to the FIFO rule is stored on the RAM 302 as needed. As to the image data stored on the RAM 302, a transfer enable clock 404 is input under control of a horizontal synchronization signal 406, and each pixel data 405 is transferred to the control unit 115 in synchronization with a rise of the transfer enable clock 404. A horizontal synchronization signal 403 is a clock signal for controlling a start of acquisition of one CCD line, and a pulse width modulation (PWM) signal for driving each pickup roller 0204 on the scanner unit 112 is generated in synchronization with the horizontal synchronization signal 403. Specifically, if the period of the horizontal synchronization signal 403 becomes shorter, the rotation rate of the pickup roller 0204 becomes relatively higher, and document sheets are conveyed faster, so that the reading rate per document increases. In a case where the period of the horizontal synchronization signal 403 is decreased, if the number X of pixels of the CCD element is the same, reading from the CCD element is to be executed in a short period of time, so that the period of the reading clock 401 becomes shorter.

If the period of the reading clock 401 becomes shorter, data storage on the RAM 302 is expedited, so that data output from the RAM 302 is to be executed in a short period of time in synchronization therewith. Consequently, the amount of data transfer per unit time from the scanner unit 112 to the RAM 104 or to the image processing unit 111 via the image bus 110 increases. If the amount of data transfer per unit time increases, the load on the image processing unit 111 or the image bus 110 increases, and this can lead to, for example, a delay in image processing during a print job by the printer unit 113 and in data transfer.

FIG. 5 is a sequence diagram illustrating a reading operation sequence. The sequence is executed by the scanner unit control application and a job control application. The scanner unit control application controls the scanner unit 112, and the job control application controls the control unit 115. Both applications are stored in a non-volatile area, such as a ROM or storage memory, and after an image forming apparatus is turned on, the applications are read onto a RAM and executed by a CPU.

In step S501, the scanner unit control application receives a reading start instruction, outputs various control clocks, and reads a document.

In a case where a transfer enable clock is changed to high-speed, an image transfer time tv 502 in the sequence diagram decreases, and the reading rate increases.

Since the capacity of the RAM 302 is limited, the scanner unit 112 transfers one image to the control unit 115 when the scanner unit 112 has read one document sheet. At this time, a reading clock is coincident with the transfer enable clock. Alternatively, while the RAM 302 of a reading unit can store data, document reading can be continued in a preceding manner without synchronizing with the image data transfer to the control unit 115 as in the sequence diagram in FIG. 5.

Figure 6:
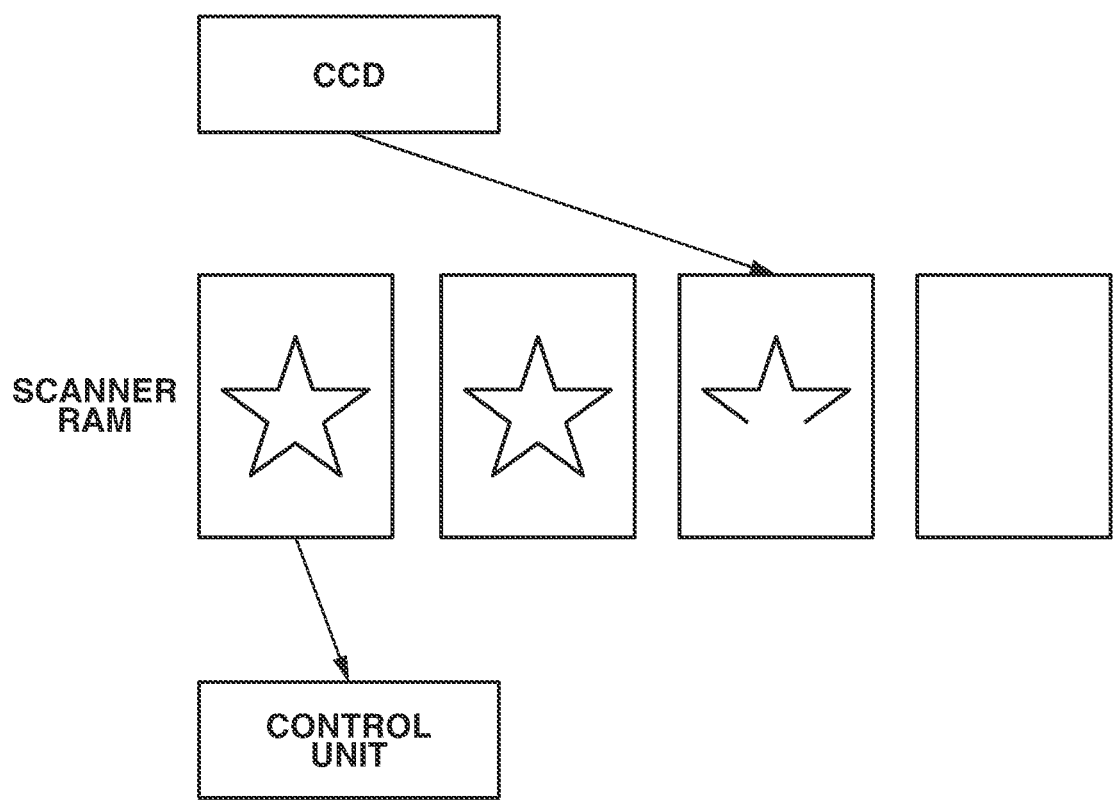
FIG. 6 is a conceptual diagram illustrating a random access memory (RAM) of the scanner unit according to an exemplary embodiment of the present disclosure.

FIG. 6 illustrates how image data is stored on the RAM 302 of the scanner unit 112. As described above with reference to the sequence in FIG. 5, in a case where the RAM 302 has a free space, the scanner unit 112 continues to transfer image data to the RAM 302 and stores the image data on the RAM 302. The stored image data is output to the control unit 115 in synchronization with a transfer enable clock, and if data corresponding to one document sheet is output, the area is used in next document reading.

Figure 7:
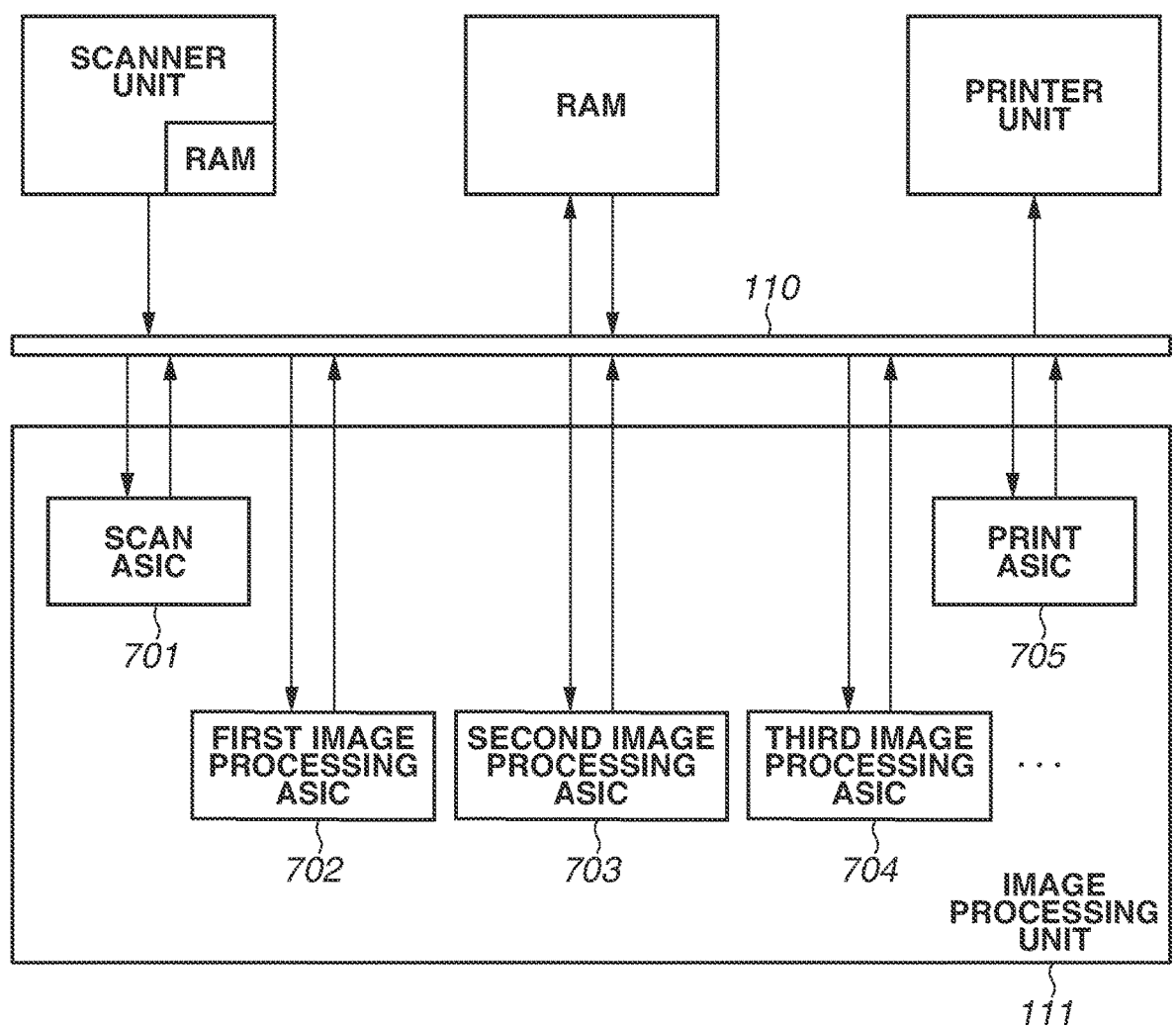
FIG. 7 is a block diagram illustrating an image processing unit according to an exemplary embodiment of the present disclosure.

Next, a configuration of the image processing unit 111 in FIG. 1 will be described in more detail below with reference to FIG. 7. The image processing unit 111 includes a plurality of ASICs 701, 702, 703, 704, and 705 configured to execute image processing, such as resolution conversion, compression and decompression, binary/multi-value conversion, on input/output image data. The ASICs 701, 702, 703, 704, and 705 each input and output the image data from and to the shared RAM 104 via the image bus 110.

Since the shared image bus 110 is used, various processes of image processing are simultaneously executed. When the image bus 110 is used for a plurality of processes at the same time, the data bus limit may be exceeded to cause the processes to delay or stop. Especially in a case where the scanner unit 112 reads documents at high speed and the transfer enable clock is therefore operated at high speed, a significant amount of data is momentarily transferred from the scanner unit 112 to the image bus 110.

Figure 8:
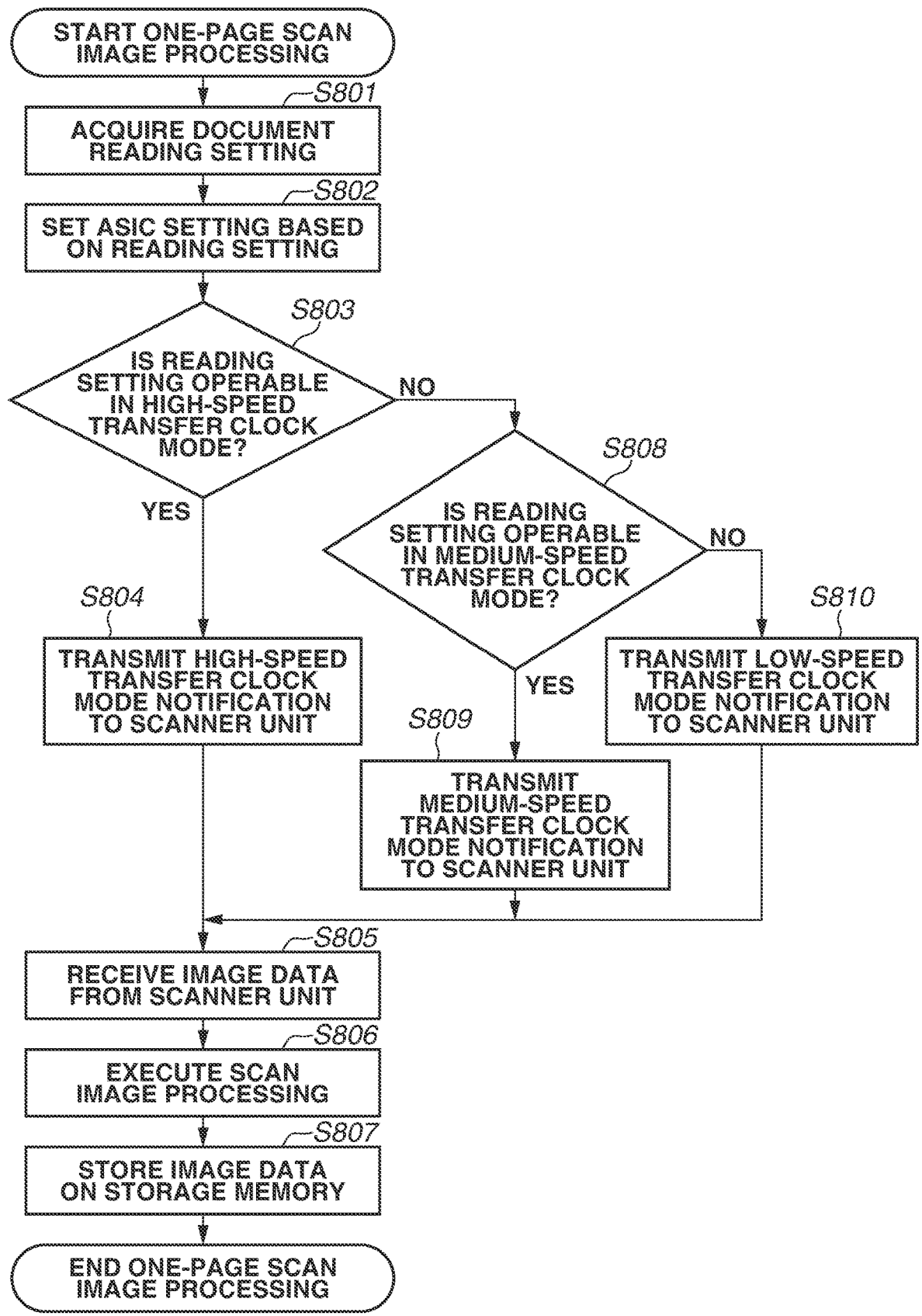
FIG. 8 is a flowchart illustrating an operation of the image processing apparatus according to a first exemplary embodiment.

Next, a process of switching a transfer enable clock based on a scan job setting and executing one-page scan image processing will be described below with reference to FIG. 8. The CPU 301 reads a program stored on the ROM 304 onto the RAM 302 and executes the read program to thereby realize the process illustrated in the flowchart in FIG. 8. The flowchart in FIG. 8 is started if an instruction to execute a job involving scanning is received via the operation unit 114. An example of a job involving scanning is a copy job of printing the scanned image data. Other examples are a box job of storing the scanned image data on a storage memory, a send job of externally transmitting the scanned image data by email, and a fax job of transmitting the scanned image data by fax.

The process illustrated in the flowchart in FIG. 8 is repeated a number of times corresponding to the number of read target documents loaded on the DF unit.

An operation in a case where the transfer enable clock includes three clock levels, that is, a high-speed transfer clock, an medium-speed transfer clock, and a low-speed transfer clock will be described below. However, the number of selectable clock levels can be two or four or more.

As used herein, the term "high-speed transfer clock" refers to a clock rate at which image data corresponding to 250 sheets can be transferred per minute. The term "medium-speed transfer clock" refers to a clock rate at which image data corresponding to 150 sheets can be transferred per minute. The term "low-speed transfer clock" refers to a clock rate at which image data corresponding to 50 sheets can be transferred per minute. The clock rates are mere examples and are not limited to those described above. The faster the clock rate, the faster the image data transfer rate, and the slower the clock rate, the slower the image data transfer rate.

In step S801, the CPU 301 acquires a document reading setting.

In step S802, the CPU 301 selects an ASIC for use in executing scanning based on the reading setting acquired in step S801 and sets a setting to the ASIC based on the reading setting.

In step S803, the CPU 301 determines whether the reading setting is operable in a high-speed transfer clock mode. A table illustrated in FIG. 9 is used in making the determination. In a case where the CPU 301 determines that the reading setting is operable in the high-speed transfer clock mode (YES in step S803), the processing proceeds to step S804. On the other hand, in a case where the CPU 301 determines that the reading setting is not operable in the high-speed transfer clock mode (NO in step S803), the processing proceeds to step S808.

In step S804, the CPU 301 notifies the scanner unit 112 that an operation will be executed in the high-speed transfer clock mode. The scanner unit 112 having received the notification transfers image data to the control unit 115 at a clock rate corresponding to the high-speed transfer clock mode.

In step S805, the CPU 301 receives image data from the scanner unit 112.

In step S806, the CPU 301 executes image processing on the received image data.

In step S807, the CPU 301 stores the image data on the storage memory 105.

In step S808, the CPU 301 determines whether the reading setting is operable in a medium-speed transfer clock mode. In a case where the CPU 301 determines that the reading setting is operable in the medium-speed transfer clock mode (YES in step S808), the processing proceeds to step S809. On the other hand, in a case where the CPU 301 determines that the reading setting is not operable in the medium-speed transfer clock mode (NO in step S808), the processing proceeds to step S810.

In step S809, the CPU 301 notifies the scanner unit 112 that an operation will be executed in the medium-speed transfer clock mode. The scanner unit 112 having received the notification transfers image data to the control unit 115 at a clock rate corresponding to the medium-speed transfer clock mode.

In step S810, the CPU 301 notifies the scanner unit 112 that an operation will be executed in a low-speed transfer clock mode. The scanner unit 112 having received the notification transfers image data to the control unit 115 at a clock rate corresponding to the low-speed transfer clock mode.

Next, scan job settings as a clock switch determination condition in FIG. 8 will be described below with reference to FIG. 9. The scan job settings that affect the amount of data transfer are settings of color/monochrome reading (901), one-sided/two-sided reading (902), reading resolution (903), and document size (904). The scan job settings are received from a user via the operation unit 114 and stored on the RAM 104 before a job execution instruction is received.

A transfer clock switch condition is determined based on the scan settings (reading setting) as in FIG. 9. In steps S803 and S808, the high-speed transfer clock, the medium-speed transfer clock, or the low-speed transfer clock is determined based on the condition. For example, in a case where a color document-reading setting, a one-sided document reading setting, a reading resolution of 600 dpi×600 dpi, and an image size of A4 or larger are set, the CPU 301 transmits a low-speed transfer clock mode operation notification.

The conditions in FIG. 9 are mere examples, and the present exemplary embodiment is not limited to the conditions. For example, while the case has been described above where the document reading size of A4 is set as a predetermined size and the transfer rate is changed based on whether the reading size is greater than or equal to the predetermined size as an example, the predetermined size can be a size other than A4. The references can be changed based on the amount of data the image data bus can process at a time.

As described above with reference to FIGS. 5 and 6, while the RAM 302 has free space, the scanner unit 112 continues reading and stores image data on the RAM 302. Thus, the reading rate does not decrease when the transfer clock is switched. The scanner unit 112 continues reading, and if the RAM 302 no longer has free space, the scanner unit 112 waits until the RAM 302 has free space again, and then the scanner unit 112 continues the next reading.

As described above, the transfer enable clock for image transfer from the scanner unit 112 to the control unit 115 is switched based on the scan job reading settings, so that the reading rate of the scanner unit 112 is increased.

A second exemplary embodiment will be described below. In the first exemplary embodiment, the method of switching the transfer enable clock for scan image processing to the high-speed transfer clock, the medium-speed transfer clock, or the low-speed transfer clock based on the scan job settings is described. In the second exemplary embodiment, a method in which a plurality of transfer clocks is switched based on a job type in the scan image processing and simultaneously executed will be described below.

An example of a job type in the execution of image processing on scanned image data is a copy job for printing scanned image data. Other examples are a box job for storing scanned image data on a storage memory, a send job for externally transmitting scanned image data by email, and a fax job for transmitting scanned image data by fax. The send job and the fax job are examples of transmission jobs. A different type of processing is executed in the scan image processing depending on the job type, and the amount of data transfer is different.

For example, in a case of scan image processing in a copy job, scanned image data is used in print processing, and scan image processing is executed at 600×600 dpi corresponding to a high engine resolution. Further, in a box job, thumbnail images for a preview are also stored so that a user can use a preview when using an image stored on the storage memory 105, and this increases the number of steps compared to other scan image processing. Further, in a send job, there is a case where an operation is executed at 300×300 dpi and a reading operation is executed at high speed.

Figure 10:
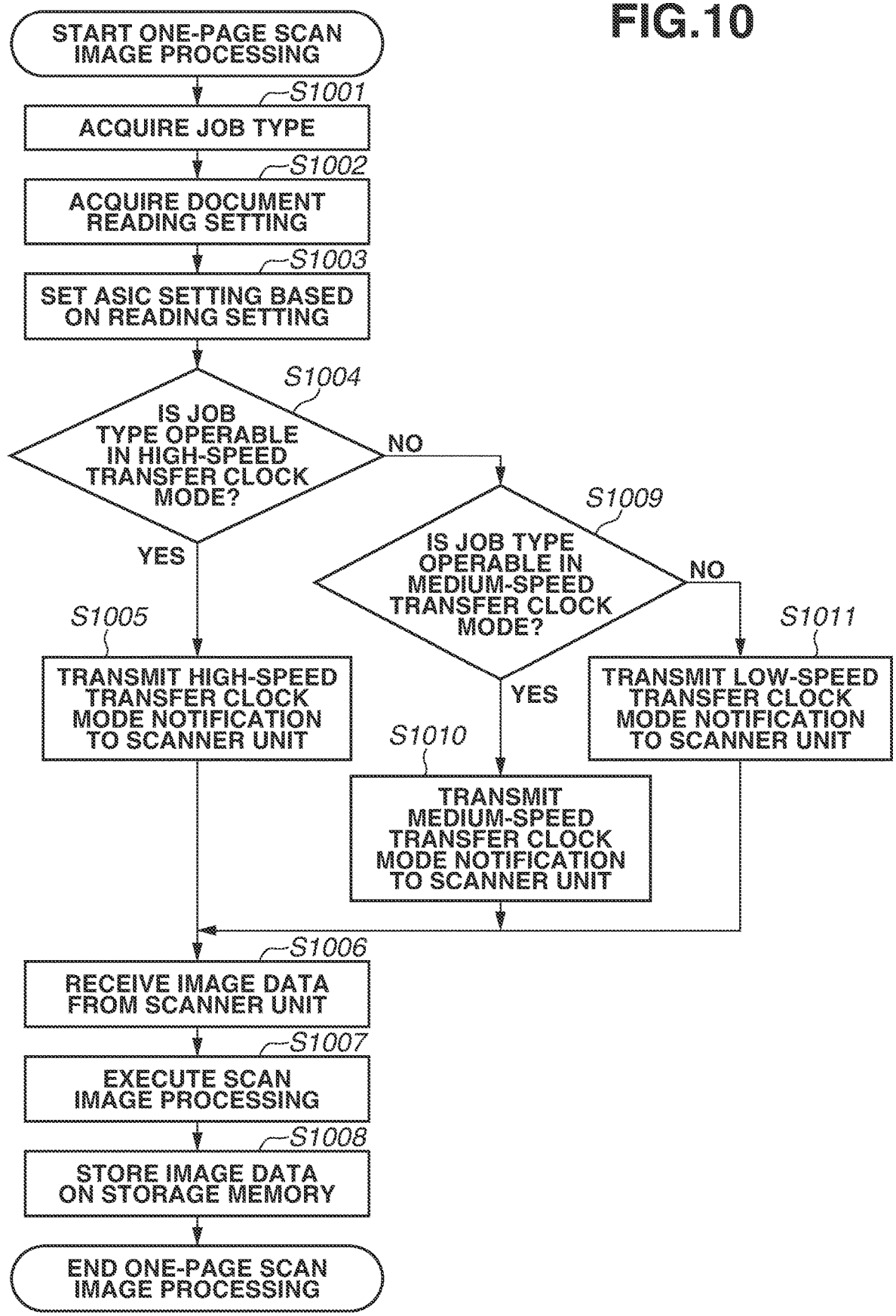
FIG. 10 is a flowchart illustrating an operation of an image processing apparatus according to a second exemplary embodiment.

As described above, since the amount of data transfer varies depending on the job type, the high-speed transfer clock, the medium-speed transfer clock, and the low-speed transfer clock are switched based on the job type. This process will be described below with reference to FIG. 10. The CPU 301 reads a program stored on the ROM 304 to load onto the RAM 302 and executes the read program to thereby realize the process illustrated in the flowchart in FIG. 10. The flowchart in FIG. 10 is started when an instruction to execute a job involving scanning is received via the operation unit 114.

In step S1001, the CPU 301 acquires a job type that executes the scan image processing.

In step S1002, the CPU 301 acquires a document reading setting. The document reading setting is received from a user via the operation unit 114 and stored on the RAM 104 before the job execution instruction is received.

In step S1003, the CPU 301 selects an ASIC for use in executing scanning based on the reading setting acquired in step S1002 and sets a setting to the ASIC.

In step S1004, the CPU 301 determines whether the job type of the job to be executed is operable in the high-speed transfer clock mode based on a table in FIG. 11. In a case where the CPU 301 determines that the job type is operable in the high-speed transfer clock mode (YES in step S1004), the processing proceeds to step S1005. On the other hand, in a case where the CPU 301 determines that the job type is not operable in the high-speed transfer clock mode (NO in step S1004), the processing proceeds to step S1009.

In step S1005, the CPU 301 notifies the scanner unit 112 that an operation will be executed in the high-speed transfer clock mode.

In step S1006, the CPU 301 receives image data from the scanner unit 112.

In step S1007, the CPU 301 executes the image processing on the received image data.

In step S1008, the CPU 301 stores the image data on the storage memory 105.

In step S1009, the CPU 301 determines whether the job type is operable in the medium-speed transfer clock mode. In a case where the CPU 301 determines that the job type is operable in the medium-speed transfer clock mode (YES in step S1009), the processing proceeds to step S1010. On the other hand, in a case where the CPU 301 determines that the job type is not operable in the medium-speed transfer clock mode (NO in step S1009), the processing proceeds to step S1011.

In step S1010, the CPU 301 notifies the scanner unit 112 that an operation will be executed in the medium-speed transfer clock mode.

In step S1011, the CPU 301 notifies the scanner unit 112 that an operation will be executed in the low-speed transfer clock mode.

A transfer clock switch condition as shown in FIG. 11 is determined based on the job type, and in steps S1004 and S1009, the high-speed transfer clock, the medium-speed transfer clock, or the low-speed transfer clock is selected based on the determined condition.

For example, in a case of a copy job, the low-speed transfer clock is selected (1101).

The conditions in FIG. 11 is a mere example, and the present exemplary embodiment is not limited to the conditions.

As described above, the transfer enable clock for image transfer from the scanner unit 112 to the control unit 115 is switched based on the job type in execution of scan image processing so that the reading rate of the scanner unit 112 is increased.

A third exemplary embodiment will be described below. In the first exemplary embodiment, the method is described that switches the transfer enable clock for scan image processing to the high-speed transfer clock, the medium-speed transfer clock, or the low-speed transfer clock based on the scan job settings. In the third exemplary embodiment, a method will be described in which a plurality of transfer clocks is switched based on whether the scan image processing is executed singly or simultaneously with other image processing in addition to the scan job setting of the scan image processing and operations.

Figure 12:
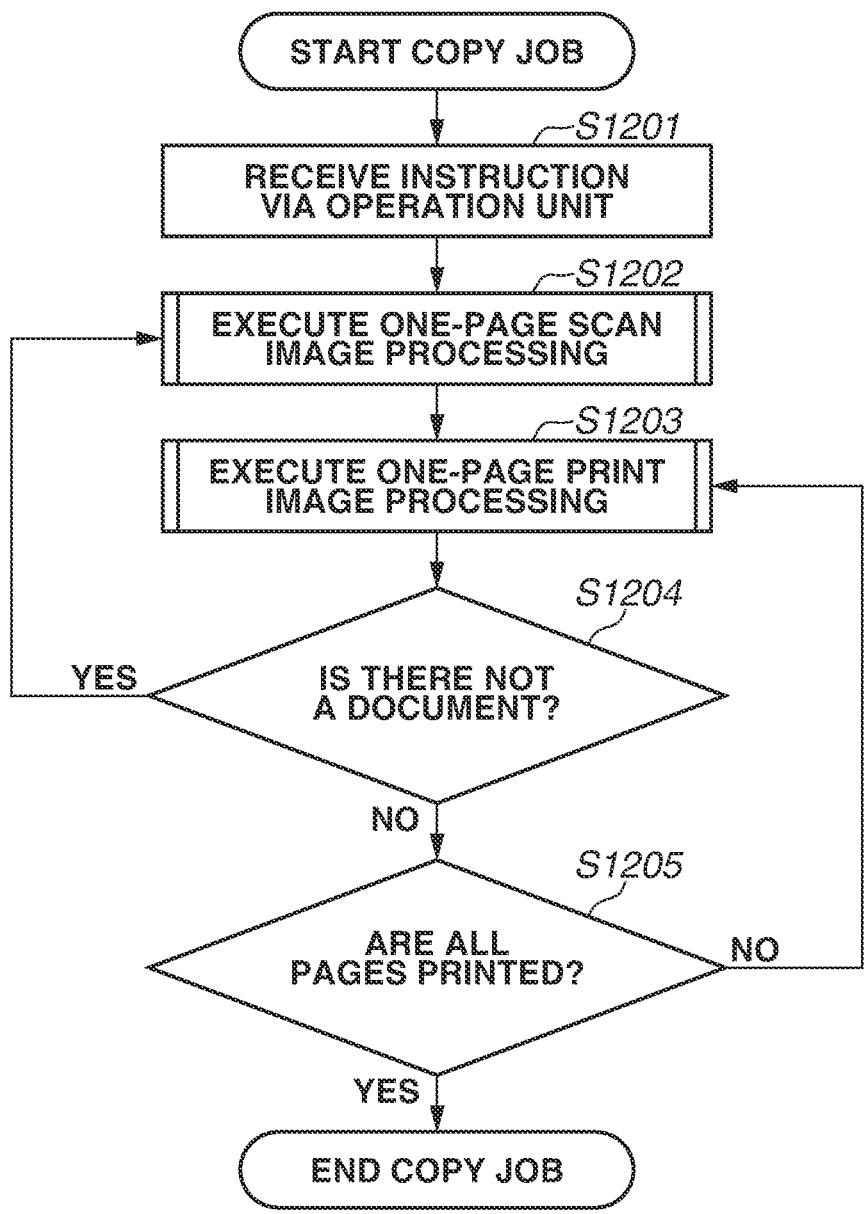
FIG. 12 is a flowchart illustrating an operation of an image processing apparatus according to a third exemplary embodiment.

FIG. 12 is a flowchart illustrating a process of a copy job. The CPU 301 reads a program stored on the ROM 304 to load onto the RAM 302 and executes the program to thereby realize the process illustrated in the flowchart in FIG. 12.

In step S1201, the CPU 301 receives a setting of a copy job to be executed via the operation unit 114.

In step S1202, the CPU 301 scans one document page based on the setting received in step S1201.

In step S1203, the CPU 301 prints one page based on the setting received in step S1201.

In step S1204, the CPU 301 determines whether there is not a document on the DF unit. In a case where the CPU 301 determines that there is not a document on the DF unit (YES in step S1204), the processing proceeds to step S1205. On the other hand, in a case where the CPU 301 determines that there is still a document on the DF unit (NO in step S1204), the processing proceeds to step S1202.

In step S1205, the CPU 301 determines whether printing of all the image data is completed. In a case where the CPU 301 determines that there is no data to be printed (YES in step S1205), the process is ended. On the other hand, in a case where the CPU 301 determines that there is still data to be printed (NO in step S1205), the processing proceeds to step S1203.

As described with reference to FIG. 12, for example, a copy job is carried out in a combination of scan image processing and print image processing. A coupling of image processings increases the amount of data processed by the image bus 110, and the data bus limit may be exceeded. Thus, the transfer enable clock is switched to execute the scan image processing simultaneously with other image processing in units of the image processing. Further, a data amount varies depending on the reading setting of scan image processing as described in the first exemplary embodiment. Thus, the transfer enable clock is switched in consideration of the reading setting and the other image processing, so that the amount of data passing through the image bus 110 is reduced.

The other image processing is rip processing with respect to page description language (PDL) data, send processing for converting image data stored on a storage memory into Joint Photographic Experts Group (JPEG) or Portable Document Format (PDF) data, or fax processing for converting an image format for fax transmission.

Figure 13:
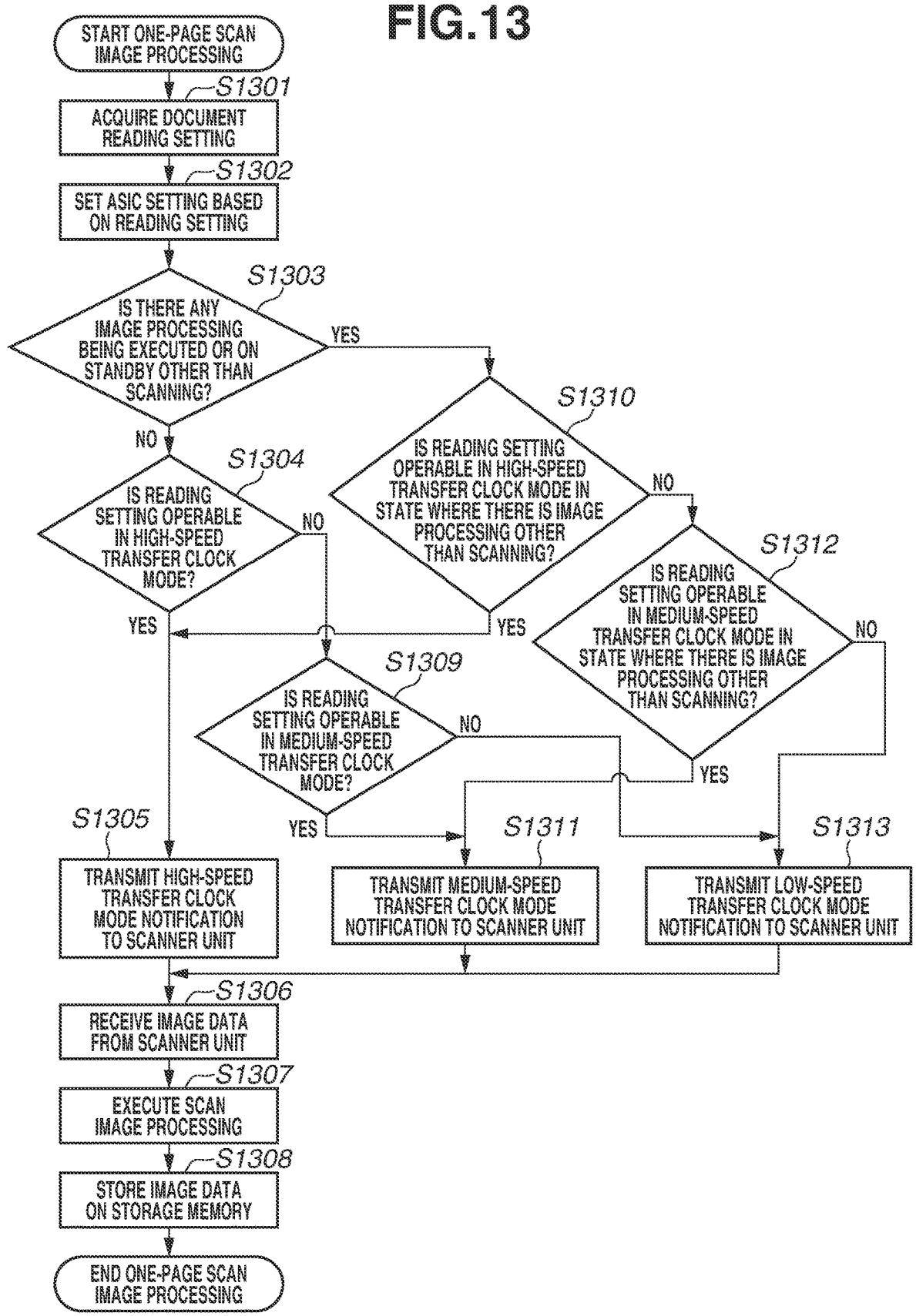
FIG. 13 is a flowchart illustrating an operation of the image processing apparatus according to the third exemplary embodiment.

Next, a process of executing scan image processing simultaneously with other image processing will be described below with reference to FIG. 13. The CPU 301 reads a program stored on the ROM 304 to load onto the RAM 302 and executes the read program to thereby realize the process illustrated in the flowchart in FIG. 13.

In step S1301, the CPU 301 acquires a document reading setting.

In step S1302, the CPU 301 selects an ASIC for use in executing the scanning based on the reading setting acquired in step S1301 and sets a setting to the ASIC.

In step S1303, the CPU 301 determines whether there is any image processing being executed or on standby other than the scanning. In a case where the CPU 301 determines that there is any image processing being executed or on standby other than scanning (YES in step S1303), the processing proceeds to step S1310. On the other hand, in a case where the CPU 301 determines that there is not image processing being executed or on standby other than scanning (NO in step S1303), the processing proceeds to step S1304.

In step S1304, the CPU 301 determines whether the reading setting is operable in the high-speed transfer clock mode when the scanning is singly operated. In a case where the CPU 301 determines that the reading setting is operable in the high-speed transfer clock mode (YES in step S1304), the processing proceeds to step S1305. On the other hand, in a case where the CPU 301 determines that the reading setting is not operable in the high-speed transfer clock mode (NO in step S1304), the processing proceeds to step S1309.

In step S1305, the CPU 301 notifies the scanner unit 112 that an operation will be executed in the high-speed transfer clock mode.

In step S1306, the CPU 301 receives image data from the scanner unit 112.

In step S1307, the CPU 301 executes image processing on the received image data.

In step S1308, the CPU 301 stores the image data on the storage memory 105.

In step S1309, the CPU 301 determines whether the reading setting is operable in the medium-speed transfer clock mode when the scanning is singly operated. In a case where the CPU 301 determines that the reading setting is operable in the medium-speed transfer clock mode (YES in step S1309), the processing proceeds to step S1311. On the other hand, in a case where the CPU 301 determines that the reading setting is not operable in the medium-speed transfer clock mode (NO in step S1309), the processing proceeds to step S1313.

In step S1310, the CPU 301 determines whether the reading setting is operable in the high-speed transfer clock mode in a state where there is image processing other than scan image processing. In a case where the CPU 301 determines that the reading setting is operable in the high-speed transfer clock mode (YES in step S1310), the processing proceeds to step S1305. On the other hand, in a case where the CPU 301 determines that the reading setting is not operable in the high-speed transfer clock mode (NO in step S1310), the processing proceeds to step S1312.

In step S1312, the CPU 301 determines whether the reading setting is operable in the medium-speed transfer clock mode in a state where there is image processing other than scan image processing. In a case where the CPU 301 determines that the reading setting is operable in the medium-speed transfer clock mode (YES in step S1312), the processing proceeds to step S1311. On the other hand, in a case where the CPU 301 determines that the reading setting is not operable in the medium-speed transfer clock mode (NO in step S1312), the processing proceeds to step S1313.

In step S1311, the CPU 301 notifies the scanner unit 112 that an operation will be executed in the medium-speed transfer clock mode.

In step S1313, the CPU 301 notifies the scanner unit 112 that an operation will be executed in the low-speed transfer clock mode.

Next, the presence/absence of other image processing and the scan job settings that are clock switch determination conditions in FIG. 13 will be described below with reference to FIG. 14.

A transfer clock switch condition as shown in FIG. 14 is determined, and in steps S1304, S1309, S1310, and S1312, the high-speed transfer clock, the medium-speed transfer clock, or the low-speed transfer clock is selected based on the determined condition.

For example, in a case where the scan job settings are color-scan, two-sided, 300×300 dpi, and A4-size document, the low-speed transfer clock (1402) is selected in a case where there is image processing other than scanning, whereas the high-speed transfer clock (1403) is selected in a case where there is no image processing other than scanning.

The conditions in FIG. 14 is a mere example, and the present exemplary embodiment is not limited to the condition.

As described above, the transfer enable clock for image transfer from the scanner unit 112 to the control unit 115 is selected from a plurality of levels based on the scan job settings in addition to a result of the determination of whether the scan image processing is to be executed singly or simultaneously with other image processing. In this way, other image processing can be simultaneously executed while the reading rate of the scanner unit 112 is increased.

A fourth exemplary embodiment will be described below. In the third exemplary embodiment, the method has been described in which a plurality of transfer clocks is switched based on whether the scan image processing is executed singly or simultaneously with other image processing in addition to the scan job settings of the scan image processing.

In the fourth exemplary embodiment, a method of switching a transfer clock that further includes the job type determination described in the second exemplary embodiment will be described below.

Figure 15B:
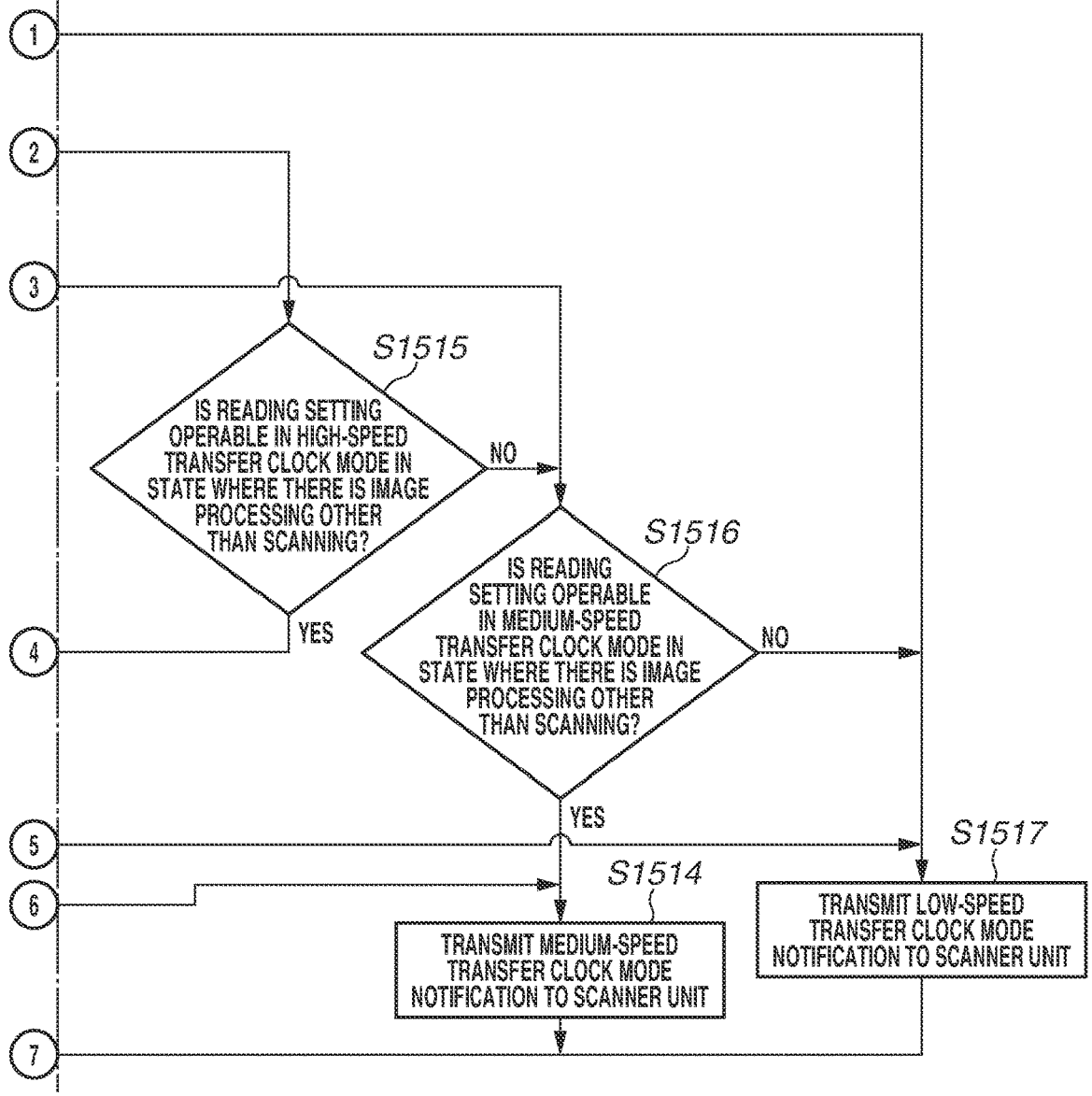

A process of executing the scan image processing simultaneously with other image processing that further includes the job type determination will be described below with reference to FIG. 15, FIG. 15A, and FIG. 15B. The CPU 301 reads a program stored on the ROM 304 load onto the RAM 302 and executes the read program to thereby realize the process illustrated in the flowchart in FIG. 15.

In step S1501, the CPU 301 acquires a job type that executes scan image processing.

In step S1502, the CPU 301 acquires a document reading setting.

In step S1503, the CPU 301 selects an ASIC for use in executing the scanning based on the reading setting acquired in step S1502 and sets a setting to the ASIC.

In step S1504, the CPU 301 determines whether the job type is operable in the high-speed transfer clock mode. In a case where the CPU 301 determines that the job type is operable in the high-speed transfer clock mode (YES in step S1504), the processing proceeds to step S1505. On the other hand, in a case where the CPU 301 determines that the job type is not operable in the high-speed transfer clock mode (NO in step S1504), the processing proceeds to step S1511.

In step S1505, the CPU 301 determines whether there is any image processing being executed or on standby other than scanning. In a case where the CPU 301 determines that there is any image processing being executed or on standby other than scanning (YES in step S1505), the processing proceeds to step S1515. On the other hand, in a case where the CPU 301 determines that there is not image processing being executed or on standby other than scanning (NO in step S1505), the processing proceeds to step S1506.

In step S1506, the CPU 301 determines whether the reading setting is operable in the high-speed transfer clock mode when scanning is singly operated. In a case where the CPU 301 determines that the reading setting is operable in the high-speed transfer clock mode (YES in step S1506), the processing proceeds to step S1507. On the other hand, in a case where the CPU 301 determines that the reading setting is not operable in the high-speed transfer clock mode (NO in step S1506), the processing proceeds to step S1513.

In step S1507, the CPU 301 notifies the scanner unit 112 that an operation will be executed in the high-speed transfer clock mode.

In step S1508, the CPU 301 receives image data from the scanner unit 112.

In step S1509, the CPU 301 executes the image processing on the received image data.

In step S1510, the CPU 301 stores the image data on the storage memory 105.

In step S1511, the CPU 301 determines whether the job type is operable in the medium-speed transfer clock mode. In a case where the CPU 301 determines that the job type is operable in the medium-speed transfer clock mode (YES in step S1511), the processing proceeds to step S1512. On the other hand, in a case where the CPU 301 determines that the job type is not operable in the medium-speed transfer clock mode (NO in step S1511), the processing proceeds to step S1517.

In step S1512, the CPU 301 determines whether there is any image processing being executed or on standby other than scanning. In a case where the CPU 301 determines that there is any image processing being executed or on standby other than scanning (YES in step S1512), the processing proceeds to step S1516. On the other hand, in a case where the CPU 301 determines that there is not image processing being executed or on standby other than scanning (NO in step S1512), the processing proceeds to step S1513.

In step S1513, the CPU 301 determines whether the reading setting is operable in the medium-speed transfer clock mode when scanning is singly operated. In a case where the CPU 301 determines that the reading setting is operable the medium-speed transfer clock mode (YES in step S1513), the processing proceeds to step S1514. On the other hand, in a case where the CPU 301 determines that the reading setting is not operable in the medium-speed transfer clock mode (NO in step S1513), the processing proceeds to step S1517.

In step S1515, the CPU 301 determines whether the reading setting is operable in the high-speed transfer clock mode in a state where there is image processing other than scan image processing. In a case where the CPU 301 determines that the reading setting is operable in the high-speed transfer clock mode (YES in step S1515), the processing proceeds to step S1507. On the other hand, in a case where the CPU 301 determines that the reading setting is not operable in the high-speed transfer clock mode (NO in step S1515), the processing proceeds to step S1516.

In step S1516, the CPU 301 determines whether the reading setting is operable in the medium-speed transfer clock mode in a state where there is image processing other than scan image processing. In a case where the CPU 301 determines that the reading setting is operable in the medium-speed transfer clock mode (YES in step S1516), the processing proceeds to step S1514. On the other hand, in a case where the CPU 301 determines that the reading setting is not operable in the medium-speed transfer clock mode (NO in step S1516), the processing proceeds to step S1517.

In step S1514, the CPU 301 notifies the scanner unit 112 that an operation will be executed in the medium-speed transfer clock mode.

In step S1517, the CPU 301 notifies the scanner unit 112 that an operation will be executed in the low-speed transfer clock mode.

The job type, the presence/absence of other image processing, and the scan job settings as clock switch determination conditions in FIG. 15 are described above with reference to FIGS. 11 and 14.

As illustrated in FIG. 11, in a case of a copy job, only the low-speed transfer clock is available, so that the low-speed transfer clock is determined without further checking the presence/absence of other image processing and the scan job settings. On the contrary, in a case where the high-speed transfer clock is available as in a case of a send job, the clock is switched based on the presence/absence of other image processing and the scan job settings according to the conditions in FIG. 14.

The conditions is a mere example, and the present exemplary embodiment is not limited to the conditions.

As described above, the transfer enable clock for image transfer from the scanner unit 112 to the control unit 115 is switched based on the job type in the scanning, whether scan image processing is executed singly or simultaneously with other image processing, and the scan job settings. With this switching, other image processing is simultaneously executed while the reading rate of the scanner unit 112 is increased.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-191579, filed Oct. 18, 2019, which is hereby incorporated by reference herein in its entirety.

What is claimed is:

1. An image processing apparatus comprising:
a reader that reads a document;
a controller;
a reader controller that transfers image data generated by reading the document by the reader to the controller, wherein the controller comprises an image processor that processes the image data; and
a user interface that receives a color/monochrome reading setting indicating whether the reader reads the document in color or monochrome, and a reading resolution at which the reader reads the document,
wherein the image processing apparatus determines an image data transfer rate of the image data by the reader controller based on at least the color/monochrome reading setting and the reading resolution received by the user interface, and
wherein the image processing apparatus determines the image data transfer rate of the image data by the reader controller such that the image data transfer rate to be determined in a certain case where the user interface receives a color reading setting of reading the document in color and a first reading resolution is slower than the image data transfer rate to be determined in a certain case where the user interface receives the color reading setting of reading the document in color and a second reading resolution which is smaller than the first reading resolution.

2. The image processing apparatus according to claim 1, wherein the image processing apparatus determines whether another job is being executed when the reader reads the document, wherein the image processing apparatus determines the image data transfer rate of the image data based on at least the color/monochrome reading setting and the reading resolution received by the user interface and a result of the determination by the image processing apparatus.

3. The image processing apparatus according to claim 2, wherein the image data transfer rate is determined by changing an image data transfer clock.

4. The image processing apparatus according to claim 1, wherein the user interface further receives one-sided/two-sided reading setting for reading the document, and wherein the image processing apparatus determines the image data transfer rate of the image data by the reader controller based on at least the color/monochrome reading setting, the reading resolution, and the one-sided/two-sided reading setting received by the user interface.

5. The image processing apparatus according to claim 1, wherein in a case where the user interface receives the color reading setting of reading the document in color, a two-sided reading setting, a first reading resolution, and a size larger than or equal to a predetermined document size, the image processing apparatus determines a third transfer rate as the image data transfer rate of the image data by the reader controller, and wherein in a case where the user interface receives the monochrome reading setting of reading the document in monochrome, a one-sided reading setting, the first reading resolution, and a size larger than or equal to the predetermined document size, the image processing apparatus determines a fourth transfer rate slower than the third transfer rate as the image data transfer rate of the image data by the reader controller.

6. The image processing apparatus according to claim 1, wherein the image processing apparatus determines the image data transfer rate from a plurality of predetermined transfer rates.

7. The image processing apparatus according to claim 1, wherein the image processor executes image processing on the image data transferred by the reader controller.

8. The image processing apparatus according to claim 1, further comprising a printer that prints an image based on the image data on which image processing is executed by the image processor.

9. The image processing apparatus according to claim 1, further comprising a communicator that transmits the image data on which image processing is executed by the image processor.

10. An image processing apparatus comprising:
a reader that reads a document;
a controller; and
a reader controller that transfers image data generated by reading the document by the reader to the controller,
wherein the controller comprises an image processor that processes the image data,
wherein the controller executes a job for reading the document by the reader and processing image data generated by reading the document,
wherein the image processing apparatus determines whether another job is executed when the reader reads the document, and
wherein the image processing apparatus determines the image data transfer rate of the image data by the reader controller based on the type of the job and a result of the determination by the image processing apparatus.

11. The image processing apparatus according to claim 10, wherein the image data transfer rate is determined by changing an image data transfer clock.

12. An image processing apparatus comprising:
a reader that reads a document;
a controller; and
a reader controller that transfers image data generated by reading the document by the reader to the controller,
wherein the controller comprises an image processor that processes the image data,
wherein the controller that executes a job for reading the document by the reader and processing image data generated by reading the document,
wherein in a case where a type of the job is a transmission job of transmitting the image data generated by reading the document by the reader, the image processing apparatus determines a first transfer rate as an image data transfer rate of the reader controller, and
wherein in a case where a type of the job is a copy job for performing printing based on the image data generated by reading the document by the reader, the image processing apparatus determines a second transfer rate slower than the first transfer rate as the image data transfer rate of the reader controller.

13. An image processing apparatus comprising:
a reader that reads a document;
a controller; and
a reader controller that transfers image data generated by reading the document by the reader to the controller,
wherein the controller comprises an image processor that processes the image data,
wherein the controller that executes a job for reading the document by the reader and processing image data generated by reading the document,
wherein in a case where a type of the job is a transmission job for storing image data generated by reading the document by the reader in a storage, the image processing apparatus determines a first transfer rate as an image data transfer rate of the image data by the reader controller, and
wherein in a case where a type of the job is a copy job for performing printing based on the image data by reading the document by the reader, the image processing apparatus determines a second transfer rate slower than the first transfer rate as the image data transfer rate of the image data by the reader controller.

14. A method of controlling an image processing apparatus including a reader that reads a document, a controller, a reader controller that transfers the image data generated by reading the document by the reader to the controller, the controller comprising an image processor that processes the image data, the method comprising:
receiving a color/monochrome reading setting indicating whether the reader reads the document in color or monochrome and a reading resolution at which the reader reads the document; and
determining an image data transfer rate of the image data by the reader controller based on at least the received color/monochrome reading setting and the received reading resolution,
wherein the image data transfer rate of the image data by the reader controller is determined such that the image data transfer rate to be determined in a certain case where a color reading setting of reading the document is received in color and a first reading resolution is slower than the image data transfer rate to be determined in a certain case where the color reading setting of reading the document is received in color and a second reading resolution which is smaller than the first reading resolution.

15. A non-transitory computer readable storage medium for storing a computer program for causing a computer to execute a method of controlling an image processing apparatus including a reader that reads a document, a controller, a reader controller that transfers the image data generated by reading the document by the reader to the controller, the controller comprising an image processor that processes the image data, the method comprising:
receiving a color/monochrome reading setting indicating whether the reader reads the document in color or monochrome and a reading resolution at which the reader reads the document; and
selecting an image data transfer rate of the image data by the reader controller based on at least the received color/monochrome reading setting and the received reading resolution,
wherein the image data transfer rate of the image data by the reader controller is determined such that the image data transfer rate to be determined in a certain case where a color reading setting of reading the document is received in color and a first reading resolution is slower than the image data transfer rate to be determined in a certain case where the color reading setting of reading the document is received in color and a second reading resolution which is smaller than the first reading resolution.

16. An image processing apparatus comprising:
a reader that reads a document;
a controller;
a reader controller that transfers image data generated by reading the document by the reader to the controller; and
a user interface that receives a reading resolution at which the reader reads the document,
wherein the controller comprises an image processor that processes the image data,
wherein the image processing apparatus determines an image data transfer rate of the image data by the reader controller based on at least the reading resolution received by the user interface, and
wherein the image processing apparatus determines the image data transfer rate of the image data by the reader controller such that the image data transfer rate to be determined in a certain case where the user interface receives a first reading resolution is slower than the image data transfer rate to be determined in a certain case where the user interface receives a second reading resolution which is smaller than the first reading resolution.

17. The image processing apparatus according to claim 16, wherein the image processing apparatus determines whether another job is being executed when the reader reads the document, and
wherein the image processing apparatus determines the image data transfer rate of the image data based on at least the reading resolution received by the user interface and a result of the determination by the image processing apparatus.

18. The image processing apparatus according to claim 17, wherein the image data transfer rate is determined by changing an image data transfer clock.

19. The image processing apparatus according to claim 16, wherein, when the user interface receives the same setting values about settings which are different from the reading resolution, the image processing apparatus determines the image data transfer rate of the image data by the reader controller such that the image data transfer rate to be determined in a certain case where the user interface receives a first reading resolution is slower than the image data transfer rate to be determined in a certain case where the user interface receives a second reading resolution which is smaller than the first reading resolution.

20. The image processing apparatus according to claim 16, wherein the image processing apparatus determines the image data transfer rate of the image data by the reader controller to be the same image data transfer rate not depending on other settings which are other than the reading resolution in a case where the user interface receives a predetermined reading resolution.

21. An image processing apparatus comprising:
a reader that reads a document;
a controller;
a reader controller that transfers image data generated by reading the document by the reader to the controller; and
a user interface that receives a reading resolution at which the reader reads the document,
wherein the controller comprises an image processor that processes the image data,
wherein the reader controller transfers the image data to the controller at a first frequency of an image data transfer clock in a certain case where the user interface receives a first reading resolution, and
wherein the reader controller transfers the image data to the controller at a second frequency of the image data transfer clock which is lower than the first frequency in a certain case where the user interface receives a second reading resolution which is higher than the first reading resolution.

22. The image processing apparatus according to claim 21, wherein the image processing apparatus determines whether another job is being executed when the reader reads the document, and wherein the reader controller transfers the image data to the controller at a frequency of the image data transfer clock based on at least the reading resolution received by the user interface and a result of the determination by the image processing apparatus.

23. The image processing apparatus according to claim 21, wherein, when the user interface receives the same setting values about settings which are different from the reading resolution and the user interface receives the first reading resolution, the reader controller transfers the image data to the controller at the first frequency, and
wherein, when the user interface receives the same setting values about settings which are different from the reading resolution and the user interface receives the second reading resolution, the reader controller transfers the image data to the controller at the second frequency.

24. The image processing apparatus according to claim 21, wherein the reader controller transfers the image data to the controller at the same image data transfer clock not depending on other settings which are other than the reading resolution in a case where the user interface receives a predetermined reading resolution.

25. An image processing apparatus comprising:
a reader that reads a document;
a controller; and
a reader controller that transfers image data generated by reading the document by the reader to the controller, wherein the controller comprises an image processor that processes the image data, wherein the controller that executes a job for reading the document by the reader and processing the image data generated by reading the document, wherein in a case where a type of the job is a transmission job of transmitting the image data generated by reading the document by the reader, the reader controller transfers the image data to the controller at a first frequency of an image data transfer clock, and wherein in a case where a type of the job is a copy job for performing printing based on the image data generated by reading the document by the reader, the reader controller transfers the image data to the controller at a second frequency of the image transfer clock which is lower than the first frequency.

26. A method of controlling an image processing apparatus including a reader that reads a document, a controller, a reader controller that transfers image data generated by reading the document by the reader to the controller, the controller comprising an image processor that processes the image data, the method comprising:

receiving a reading resolution at which the reader reads the document;

transferring the image data from the reader controller to the controller at a first frequency of an image data transfer clock in a certain case where the user interface receives a first reading resolution; and transferring the image data from the reader controller to the controller at a second frequency of the image data transfer clock which is lower than the first frequency in a certain case where the user interface receives a second reading resolution which is higher than the first reading resolution.

* * * * *